United States Patent [19]

Frerejacques

[11] Patent Number: 4,600,343
[45] Date of Patent: Jul. 15, 1986

[54] BOLT AND ASSEMBLY USING SUCH A BOLT

[75] Inventor: Jean-Claude Frerejacques, Saint-Cosme-en-Vairais, France

[73] Assignee: Simmonds S.A., France

[21] Appl. No.: 609,982

[22] Filed: May 14, 1984

[30] Foreign Application Priority Data

May 20, 1983 [FR] France ............... 83 08437

[51] Int. Cl.⁴ ........................................... F16B 39/34
[52] U.S. Cl. ........................................ 411/303; 411/5;
411/386; 10/10 P
[58] Field of Search ............... 411/2, 3, 5, 247, 386,
411/387, 301–304, 368, 369, 542, 544, 427, 428,
431–433; 10/10 P, 10 R, 86 A

[56] References Cited

U.S. PATENT DOCUMENTS

| | | | |
|---|---|---|---|
| 1,696,523 | 12/1928 | Cochran | 411/5 |
| 2,832,616 | 4/1958 | Morse | 411/428 |
| 2,889,733 | 6/1959 | Vanderhoof | 411/432 |
| 3,399,589 | 9/1968 | Breed | 411/369 |
| 4,256,421 | 3/1981 | Kloster | 408/221 |
| 4,282,913 | 8/1981 | Trimmer | 411/303 |

FOREIGN PATENT DOCUMENTS

| | | | |
|---|---|---|---|
| 240912 | 10/1962 | Australia | 411/386 |
| 692627 | 8/1964 | Canada | 411/542 |
| 19448 | 10/1914 | France | 411/386 |
| 2106994 | 5/1972 | France | . |
| 2142201 | 1/1973 | France | . |

Primary Examiner—Thomas J. Holko
Assistant Examiner—Neill Wilson
Attorney, Agent, or Firm—Steinberg & Raskin

[57] ABSTRACT

The invention relates to a bolt comprising a screw the threaded portion of which is provided with a guiding end, and a nut whose upper portion contains a self-locking washer with which is separably associated a ring internally concentric with the washer and ensuring the centering of the screw during its introduction into the nut.

6 Claims, 4 Drawing Figures

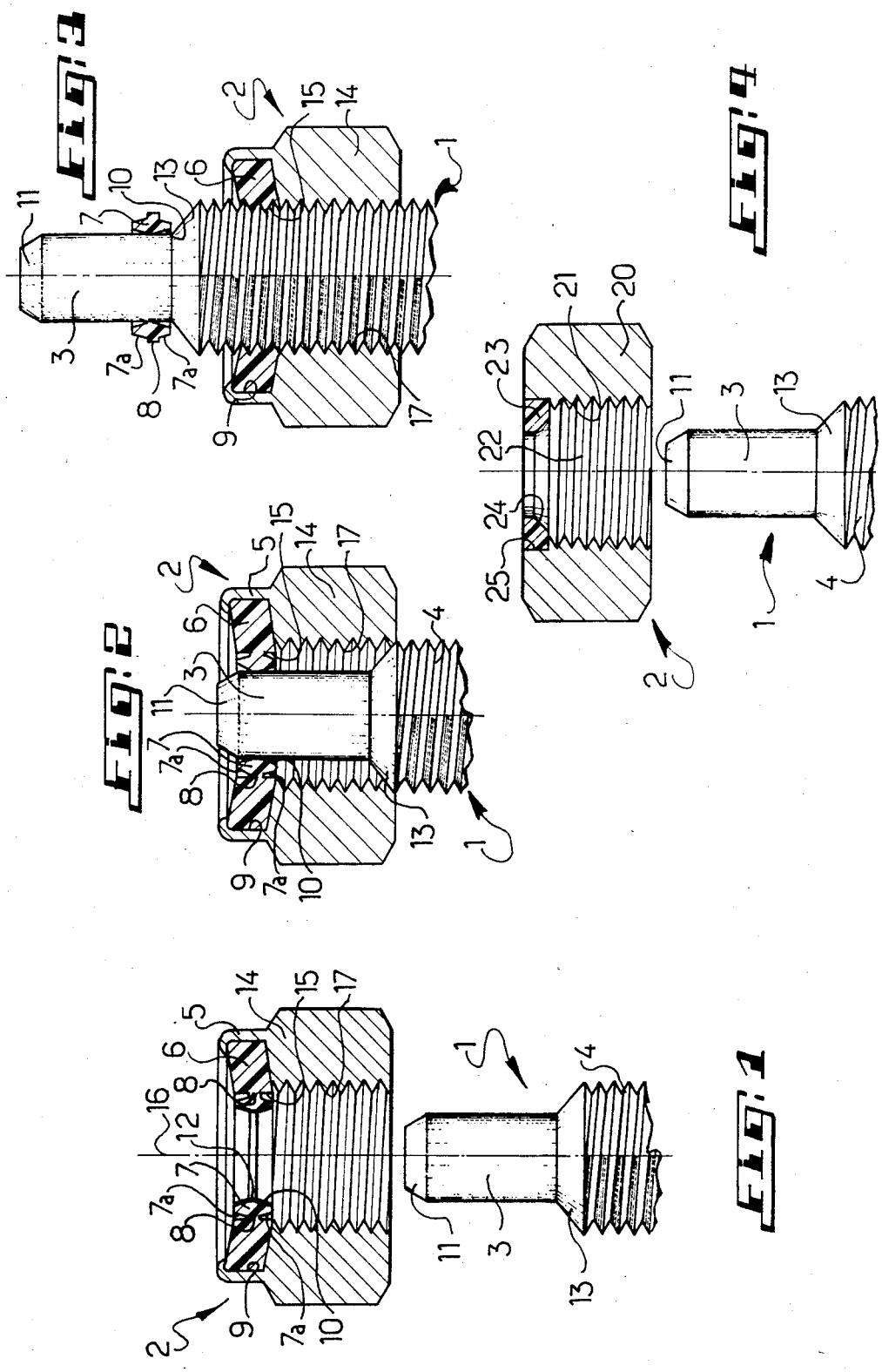

BOLT AND ASSEMBLY USING SUCH A BOLT

The present invention has essentially for a subject matter an improved bolt of the type including an externally threaded member forming a screw and co-operating with a nut, the upper portion of which contains or does not contain a self-locking washer of any suitable synthetic material.

Bolts with a self-locking nut have been known since a long time. But a problem arises when it is desired to effect automatically the screwing of the screw on the nut, whether the screw is of the self-locking type or even of a conventional type, i.e., without an incorporated self-locking washer.

Indeed, if, as is frequent nowadays, use is made of a robot to effect automatically the screwing of the screw on the nut, there is the considerable risk that the thread of the screw and of the nut might become deteriorated during the mutual engagement of the threads. This is due to the fact that the robot does not always allow the presentation of the screw exactly along the axis of the nut, so that the robot cannot effect the screwing or effects it incorrectly and deteriorates the thread of the screw and/or the nut.

The purpose of the present invention is to solve this problem by providing an improved bolt allowing the automatic centering of the screw during its introduction into the nut.

To this end, the invention has for a subject matter a bolt allowing the assembling of any parts or members and of the type including an externally threaded member forming a screw as well as a nut whose upper portion opposite to the bearing face contains a self-locking washer of any suitable material, such as for example polyamide, characterized by a ring internally concentric with the said washer and separably associated therewith, as also by an element extending the threaded end of the screw and co-operating with the said ring so as to axially guide the said screw during its introduction into the nut.

Thus, as is already understood, the screw will necessarily be presented along the axis of the nut before the screwing, since the element extending the threaded end of the screw will be positively and axially guided in passing through the ring, which ring will be ejected from the body of the nut by the screw during the screwing.

According to another feature of the invention, the said ring being cast integral with the washer is connected to the latter by a portion of frangible material.

It will also be added that the internal periphery of the ring, as well as, besides, the element or guide end extending the threaded portion of the screw are bevelled.

Thus, the co-operation of the bevels of the ring and of the guide end will allow an automatic centering at the beginning of the introduction of the screw into the nut.

According to still another feature of the invention, the said element or guide end is smaller in diameter than the threaded portion of the screw and is connected to the latter by a preferably conical shoulder capable of separating the ring from the washer.

It will also be specified here that the portion of frangible material connecting the washer to the ring is located substantially at half the thickness of the said washer and of its associated ring.

According to a preferred form of embodiment, the said ring displays a substantially lozenge-shaped cross-sectional profile.

The bolt according to the invention can perfectly use a nut of a conventional type, i.e. merely constituted by a body with an internally threaded orifice.

In this case, a ring removable or separable from the nut body is merely mounted in the threaded orifice of the nut and at its upper portion, whereas the screw, as explained previously, is provided with an element or guide end extending its threaded portion and co-operating with the said ring to ensure the centering of the screw during its introduction into the nut.

The invention is also directed to an assembly of any parts or members using a bolt complying with any one of the above-mentioned features.

But other advantages and features of the invention will appear more clearly from the following detailed description made with reference to the appended drawings given solely by way of example and wherein:

FIG. 1 is an axial sectional view of a nut and of a screw represented partially and before its introduction into the nut;

FIG. 2 is a view similar to FIG. 1 but showing the screw at the beginning of its introduction into the nut;

FIG. 3 is still another axial sectional view of the nut and the screw, but showing the latter at the end of its screwing into the nut, i.e; when the ring has been separated from the self-locking washer; and FIG. 4 illustrates diagrammatically and in axial section a bolt according to the invention using a conventional nut, i.e., without an incorporated self-locking washer.

According to an example of embodiment illustrated in FIGS. 1 to 3, a bolt according to the invention includes essentially an externally threaded member or screw 1 and a nut 2, the screw 1 being provided with a guide element or end 3 extending the threaded portion 4 of the screw, whereas the nut 2 contains in its upper portion 5 a self-locking washer 6 with which is separably associated a ring 7 internally concentric with the said washer.

According to a preferred form of embodiment, the washer 6 and its associated ring 7 are obtained by being cast in a single piece, and in such a manner that the ring is connected to the washer by a thin portion or membrane of frangible material 8. This thin portion 8 presents an annular configuration and, as seen clearly in the Figures, is located substantially at half the thickness of the washer 6 and of its associated ring 7. As is known per se, the washer 6 is preferably made from a synthetic material, such as for example a suitable polyamide, and is contained in an annular recess 9 formed in the upper portion 5 of the nut 2.

A bevel 10 is provided along the inner periphery of the ring 7, whereas the preferably cylindrical and smooth guide-end 3 is also provided, at its end, with a bevel 11 facilitating the centering of the screw 1 in the nut 2 as will be described later in connection with the operation of the bolt.

The guide-end 3 of the screw 1 is smaller in diameter than the threaded end 4 of the screw 1, the said diameter being very slightly smaller than that constituted by the internal periphery 12 of the ring 7 associated with the washer 6.

The guide end 3 of the screw 1 is connected to the threaded end 4 by a conical shoulder 13 capable of breaking and ejecting the ring 7 from the nut body 14, as will be explained later. It will be noted in this connection that the shoulder 13 may have any shape other than a conical shape without departing from the scope of the invention.

Referring again to the ring 7 appearing in FIGS. 1 to 3, it is seen that it presents a substantially lozenge-shaped cross-sectional profile. The bevel 10 described previously constitutes one of the sides of this lozenge. There is shown at 7a in FIGS. 1 and 3 two adjacent sides of the said lozenge, at the intersection of which is precisely located the portion of annular frangible material 8.

The inner periphery 15 of the washer 6 extends towards the axis 16 of the nut 2 a little beyond the thread 17 of the nut, so as to allow the self-locking of the nut on the screw, as is known per se.

But in a bolt according to the invention, use can perfectly be made of a nut 20 of the conventional type, as seen in FIG. 4, i.e. a nut simply provided with an internal thread 21 without self-locking washer.

In this case, there is mounted, e.g. with a tight fit, into a recess 25 of the nut 20, in the upper portion thereof, a ring 23 of a suitable synthetic material which can be separated or expelled from the nut 20 by the shoulder 13 of the screw 1, of course after the said ring has fulfilled its function of an element for guiding and centering the said screw upon its introduction into the nut. In this case, the screw 1 is provided with a guide-end 3, exactly as described previously. Furthermore, the removable ring 23 may be provided with an annular bevel 24 cooperating with the bevel 11 of the guide end 3 of the screw 1 so as to facilitate the centering.

There will now be described the operation of the form of embodiment of the bolt illustrated in FIGS. 1 to 3.

The screw 1 being held by a robot (not shown) is presented substantially along the axis 16 of the nut 2, as seen clearly in FIG. 1.

Thereafter, as seen in FIG. 2, the screw 1 is introduced into the threaded orifice of the nut 2, so that the guide end 3 centers itself owing to the co-operation between the bevels 10 and 11, and is guided in passing through the ring 7. This ensures an accurate positioning along the screwing axis, so that the thread at the end 4 of the screw 1 will correctly be inserted into the thread 17 of the nut 2 without any risk of deterioration of the turns.

After thus ensuring that the screwing can take place and continue correctly, the shoulder 13 therefore moves into abutment against the ring 7, thus breaking the connection 8 as seen clearly in FIG. 3. It will be noted that, at that moment, the washer 8 will fulfil, by its periphery 15, its function of self-locking on the threaded portion 4 of the screw 1.

It is therefore understood that the assembly consisting of the washer 6 and the ring 7 first ensures an axial centering of the screw 1 with respect to the nut 2, and then a self-locking of the nut on the screw.

It will be added here that the symmetrical configuration of the washer 6 and of its associated ring 7 advantageously allows the said washer to be placed in the recess 9 by one of its faces or the other, which therefore does not require any particular precaution for directing the washer during its positioning in the upper portion 5 of the nut.

The operation of the form of embodiment illustrated in FIG. 4 is substantially the same as the one just described, except that in this case there is no self-locking function to be fulfilled since the washer 6 is inexistent.

It will only be pointed out here that the screw 1 is centered in the nut 20 by the passing of the guide-end 3 into the ring 23 which is thereafter ejected by the shoulder 13 of the said screw.

There is therefore obtained, according to the invention, an improved bolt capable of being handled by a robot without any risk of incorrect screwing or of deterioration of the thread of the screw and/or of the nut of the said bolt.

Of course, the invention is by no means limited to the forms of embodiment described and illustrated which have been given by way of example only.

For example, the ring 7 may be connected separably to the washer 6 by any means other than a portion of frangible material.

The invention therefore comprises all technical means equivalent to the means described as well as their combination provided they are carried out according to its gist.

What is claimed is:

1. A bolt allowing the assembly of any members or parts, comprising an externally threaded member forming a screw, a nut having an upper portion and a bearing face opposite said upper portion, said upper portion of said nut containing a self-locking washer, a ring internally concentric with said washer and separably associated therewith, and an element extending the threaded end of the screw and co-operating with said ring to axially guide the screw during its introduction into the nut.

2. A bolt according to claim 1, wherein said ring is integral with said washer and is connected thereto by a thin portion or wall of frangible material.

3. A bolt according to claim 1, wherein the inner periphery of the ring and the guide element or end extending the threaded portion of the screw are bevelled.

4. A bolt according to claim 3, wherein said guide end is smaller in diameter than the threaded portion of the screw and is connected thereto by a conical shoulder capable of separating the ring from the washer.

5. A bolt according to claim 2, wherein said wall of frangible material connecting the washer to the ring is located substantially at half the thickness of the said washer and of its associated ring.

6. A bolt according to claim 1, wherein said ring presents a substantially lozenge-shaped cross-sectional profile.

* * * * *